US007634358B2

(12) United States Patent
Jendbro

(10) Patent No.: US 7,634,358 B2
(45) Date of Patent: Dec. 15, 2009

(54) MOBILE TERMINALS, METHODS AND COMPUTER PROGRAM PRODUCTS FOR MAP SCANNING AND CALIBRATION

(75) Inventor: Magnus Jendbro, Staffanstorp (SE)

(73) Assignee: Sony Ericsson Mobile Communications AB, Lund (SE)

( * ) Notice: Subject to any disclaimer, the term of this patent is extended or adjusted under 35 U.S.C. 154(b) by 563 days.

(21) Appl. No.: 11/284,041

(22) Filed: Nov. 21, 2005

(65) Prior Publication Data

US 2007/0118283 A1 May 24, 2007

(51) Int. Cl.
*G01C 21/00* (2006.01)

(52) U.S. Cl. ....................................................... 701/213

(58) Field of Classification Search ................. 701/200, 701/213–215, 208; 340/988; 342/357.06, 342/357.12

See application file for complete search history.

(56) References Cited

U.S. PATENT DOCUMENTS 5,467,271 A * 11/1995 Abel et al. ..................... 702/5
2002/0147910 A1 10/2002 Brundage et al.

FOREIGN PATENT DOCUMENTS

EP 1 162 474 A2 12/2001
WO WO 02/071685 A1 9/2002

OTHER PUBLICATIONS

International Search Report and Written Opinion of the International Searching Authority corresponding to PCT/US2006/009792, mailed Dec. 21, 2006.

* cited by examiner

*Primary Examiner*—Yonel Beaulieu
(74) *Attorney, Agent, or Firm*—Myers Bigel Bibley & Sajovec

(57) ABSTRACT

Mobile terminals, methods and computer program products are provided for scanning and calibrating a map using a mobile terminal. A map is scanned into the mobile terminal using the mobile terminal as a scanner. Multiple reference coordinates associated with locations on the scanned map are received at the mobile terminal from a global positioning system (GPS) associated with the mobile terminal. The scanned map is calibrated in the mobile terminal based on the received multiple reference coordinates.

20 Claims, 2 Drawing Sheets

MOBILE TERMINALS, METHODS AND COMPUTER PROGRAM PRODUCTS FOR MAP SCANNING AND CALIBRATION

FIELD OF THE INVENTION

The present invention relates to mobile terminals and, more particularly, to mobile terminals including cameras and related methods and computer program products.

BACKGROUND OF THE INVENTION

Recently, there has been a proliferation of features in the field of portable communications. Portable communications devices, such as cordless and cellular telephones, pagers, wireless modems, wireless email devices, personal digital assistants (PDAs) with communication functions, MP3 players and other portable communications devices are becoming more commonplace. Some of these mobile terminals are equipped with cameras and may be configured to communicate with a data network, such as the Internet, over the wireless communications network. Users of these mobile terminals typically take these devices with them anywhere they go, which allows these users to, for example, place phone calls, check an appointment on a calendar, check email, take pictures and/or access the Internet and the information available thereon using the mobile terminal.

SUMMARY OF THE INVENTION

Some embodiments of the present invention provide mobile terminals including a scanner module configured to scan a map into the mobile terminal. The mobile terminals further include a calibration module, coupled to the scanner module, configured to receive multiple reference coordinates associated with locations on the scanned map from a global positioning system (GPS) associated with the mobile terminal. The scanned map is calibrated in the mobile terminal based on the received multiple reference coordinates.

In further embodiments of the present invention, the calibration module may be further configured to acquire additional reference coordinates associated with locations on the scanned map and recalibrate the scanned map upon acquisition of the additional reference coordinates. The calibration module may be configured to receive the multiple reference coordinates and calibrate the scanned map within the mobile terminal without communicating with an external communications device.

In still further embodiments of the present invention, the multiple reference coordinates may be associated with a current position of the user so as to allow calibration of the scanned map based on the current position. A camera module may be further included in the mobile terminal. The scanner module may be associated with the camera module and configured to scan the map by taking a picture of the map.

In some embodiments of the present invention, the scanner module may be further configured to scan the map in multiple segments and concatenate the multiple segments of the map into a single cohesive map. A GPS module may be integrated in the mobile terminal.

Further embodiments of the present invention provide methods for scanning and calibrating a map using the mobile terminal. A map is scanned into the mobile terminal using the mobile terminal as a scanner. Multiple reference coordinates associated with locations on the scanned map are received at the mobile terminal from a global positioning system (GPS) associated with the mobile terminal. The scanned map is calibrated in the mobile terminal based on the received multiple reference coordinates.

In still further embodiments of the present invention, it may be determined if additional reference coordinates associated with locations on the scanned map have been acquired. The scanned map may be recalibrated in the mobile terminal if it is determined that additional reference coordinates have been acquired.

In some embodiments of the present invention, the multiple reference coordinates may be received and the scanned map may be calibrated without communicating with an external communications device. The multiple reference coordinates may be associated with a current position of the user so as to allow calibration of the scanned map based on the current position.

In further embodiments of the present invention, scanning the map may include taking a picture of the map. The map may be scanned in multiple segments and the multiple segments of the map may be concatenated into a single cohesive map. The GPS associated with the mobile terminal may be integrated in the mobile terminal.

Still further embodiments of the present invention provide a computer program product for scanning and calibrating a map using a mobile terminal. The computer program product includes a computer readable medium having computer readable program code embodied therein. The computer readable program code includes computer readable program code configured to scan a map into a mobile terminal using the mobile terminal as a scanner. Computer readable program code configured to receive multiple reference coordinates associated with locations on the scanned map is provided at the mobile terminal from a global positioning system (GPS) associated with the mobile terminal. Computer readable program code configured to calibrate the scanned map in the mobile terminal based on the received multiple reference coordinates is provided.

In some embodiments of the present invention, computer readable program code configured determine if additional reference coordinates associated with locations on the scanned map have been acquired may be provided. Computer readable program code configured to recalibrate the scanned map in the mobile terminal if it is determined that additional reference coordinates have been acquired may also be provided.

In further embodiments of the present invention, the computer readable program code configured to receive and the computer readable program code configured to calibrate may further include computer readable program configured to receive and calibrate without communicating with an external communications device.

In still further embodiments of the present invention, the multiple reference coordinates may be associated with a current position of the user so as to allow calibration of the scanned map based on the current position. The computer readable program code configured to scan may include computer readable program code configured to take a picture of the map.

In some embodiments of the present invention, the computer readable program code configured to scan further includes computer readable program code configured to scan the map in multiple segments and computer readable program code configured to concatenate the multiple segments of the map into a single cohesive map.

DETAILED DESCRIPTION OF EMBODIMENTS OF THE INVENTION

Figure 1:
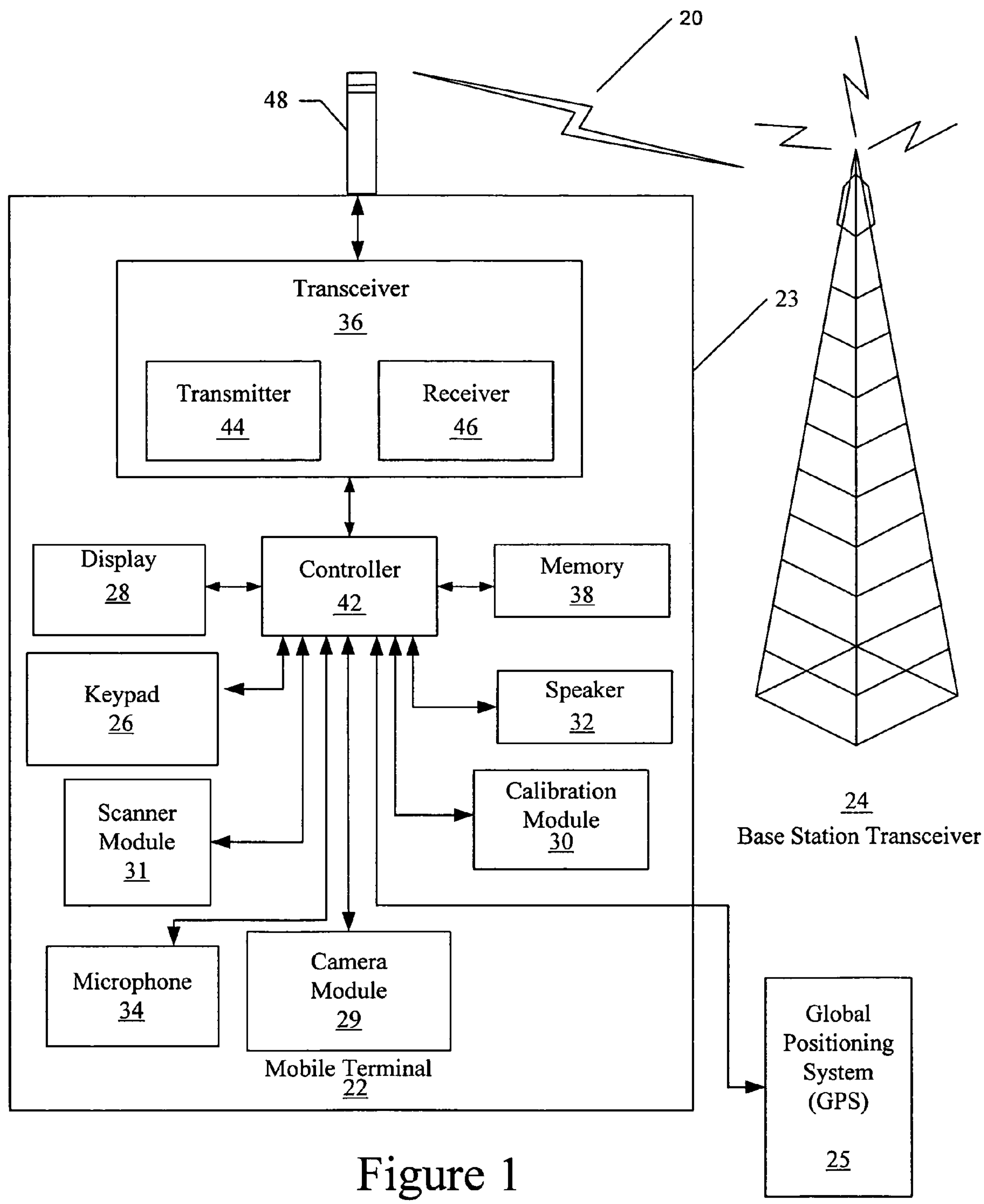
FIG. 1 is a schematic diagram of a mobile terminal according to some embodiments of the present invention and an exemplary base station transceiver.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, a "mobile terminal" includes both devices having only a wireless signal receiver without transmit abilities and devices having both receive and transmit hardware capable of two-way communication over a two-way communication link. Such devices may include cellular or other communications devices with or without a multi-line display; Personal Communications System (PCS) terminals that may combine a voice and data processing, facsimile and/or data communications capabilities; Personal Digital Assistants (PDA) that can include a radio frequency receiver and a pager, Internet/Intranet access, Web browser, organizer, calendar and/or a global positioning system (GPS) receiver; and/or conventional laptop and/or palmtop computers or other appliances, which include a radio frequency receiver. As used herein, "mobile terminal" may be portable, transportable, installed in a vehicle (aeronautical, maritime, or land-based), or situated and/or configured to operate locally and/or in a distributed fashion at any other location(s) on earth and/or in space.

Figure 2:
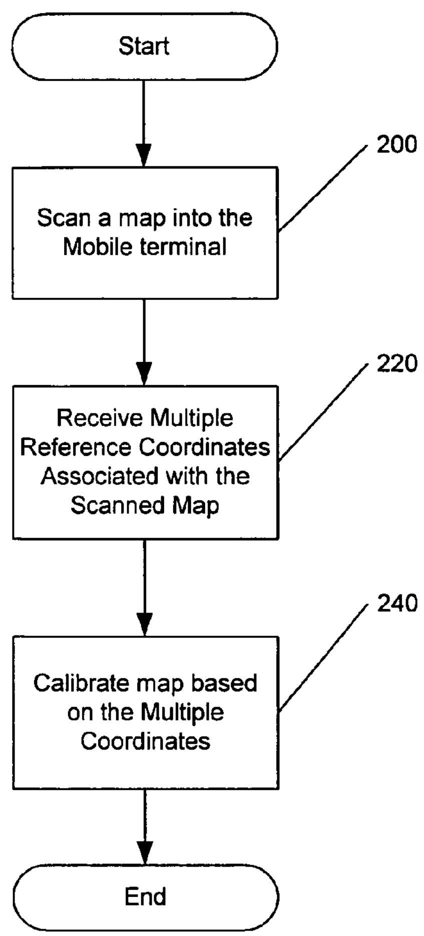
FIGS. 2 and 3 are flowcharts illustrating operations of mobile terminals according to various embodiments of the present invention.
Figure 3:
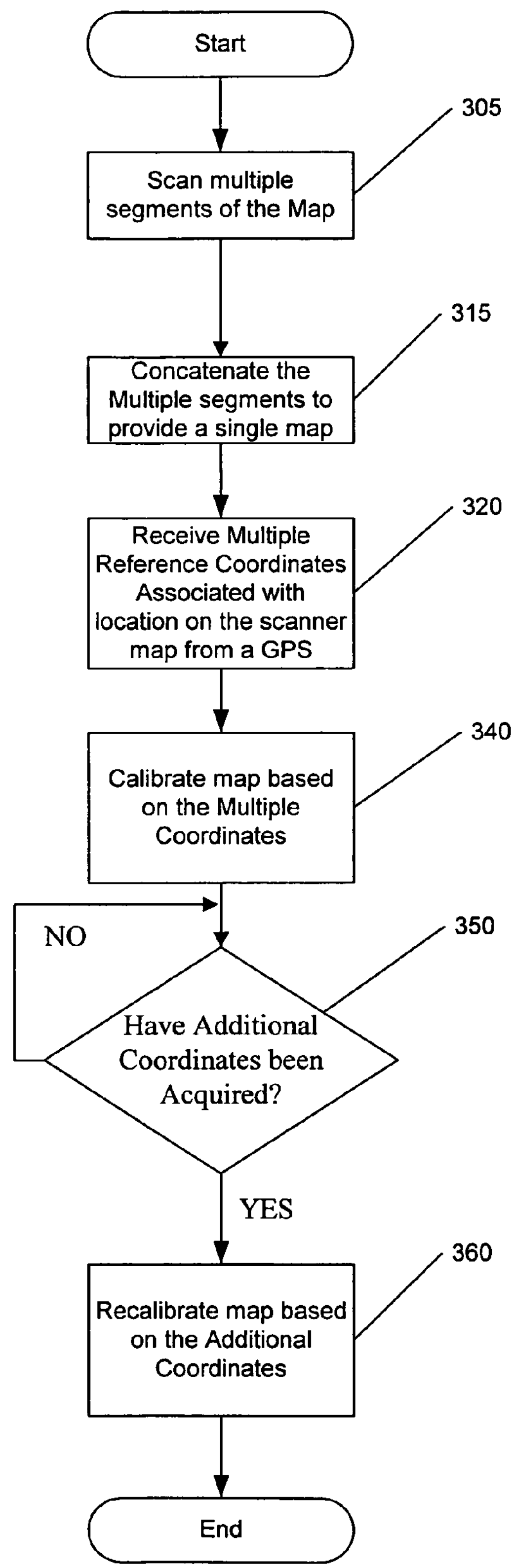

As discussed herein with respect to FIGS. 1 through 3, embodiments of the present invention provide mobile terminals, methods and computer program products for scanning and calibrating maps in the mobile terminal. Typically, a map of a place of interest, for example, hiking trails in the alps, have to be scanned (if the copyright allows) for use with navigation/GPS equipment. Once scanned, a navigation or mapping program running on, for example, a communications device, such as a personal computer, can be used to concatenate and/or calibrate the map. According to this method of scanning and calibration, you must have access to the maps before you leave for your destination, however, these map are not always available until you reach your destination. For example, if you go to the Austrian Alps to go hiking, the maps for the hiking trails are not typically available until you reach your destination. This may be a problem, as most people do not typically travel with a scanner and a personal computer. Thus, there may be no means of getting the map into the navigation/GPS equipment. Furthermore, calibration of the map typically requires multiple reference coordinates (latitude and longitude) of the corresponding reference locations on the map. You may not have access to these coordinates before you reach your destination, which may make calibration beforehand a problem.

Accordingly, mobile terminals, methods and computer program products according to some embodiments of the present invention provide scanning and calibration in a mobile terminal. In particular, a map is scanned into a mobile terminal using the mobile terminal as a scanner, for example, in mobile terminals equipped with a camera, a picture can be taken of the map. Multiple reference coordinates (latitude and longitude) associated with locations on the scanned map may be received at the mobile terminal from a GPS associated with the mobile terminal. The scanned map may then be calibrated in the mobile terminal based on the obtained multiple reference coordinates.

According to some embodiments of the present invention, once the map is obtained upon arrival at the destination, it can be scanned using the mobile terminal. It will be understood that mobile terminals according to some embodiments of the present invention will have a display with a resolution that can support a map. A GPS may then be used to calibrate the map by finding coordinates corresponding to locations close to your destination that can be found on the map, for example, a road crossing outside your hotel. Thus, some embodiments of the present invention may provide the ability to scan and calibrate the map in the mobile terminal and, therefore, do away with the need for the maps and/or coordinates before leaving for your destination as will be discussed further herein with respect to FIGS. 1 through 3.

It will be understood that although some embodiments of the present invention are discussed herein with respect to GPS, embodiments of the present invention are not limited to this configuration. As used herein, "GPS" refers to GPS, Gallileo and/or Glonass without departing from the scope of the present invention. Furthermore, as used herein, "calibration" of a map refers to receiving coordinates from, for example, the GPS, and marking the location identified by the coordinates on the map.

Referring first to FIG. 1, a schematic block diagram is provided illustrating mobile terminals 22 including a scanner module 31 and a calibration module 30 in accordance with some embodiments of the present invention. FIG. 1 illustrates a mobile terminal 22 and a base station transceiver 24 of a wireless communications network 20. It will be understood that as wireless technologies evolve, so do "wireless communication networks." As used herein, a "wireless communication network" may refer to various radio access technologies in the traditional sense, a wireless local area network (LAN) or a wireless personal area network without departing from the teachings of the present invention. These networks may include, for example, radio access technologies, such as Code division multiple access (CDMA), Enhanced Data rates for GSM Evolution (EDGE), General Packet Radio Service (GPRS), Global System for Mobile TeleCommunications (GSM), High-Speed Downlink Packet Access (HSDPA), High-Speed Uplink Packet Access (HSUPA), Universal Mobile Telecommunications System (UMTS), Wideband Code Division Multiple Access (W-CDMA) and/or WCDMA+EDGE (WEDGE) and/or Wireless Local Area Networks (WLAN), such as Wireless Fidelity (WiFi) and Worldwide Interoperability for Microwave Access (WiMAX).

According to some embodiments of the present invention, radio access technologies and/or WLANs may be used as an access media between the mobile terminal 22 and the wireless communication network 20 illustrated in FIG. 1. For example, a mobile terminal 22 may also access a data network via UMTS, GSM, EDGE, GPRS, WEDGE, CDMA, WCDMA, HSDPA, HSUPA, WIFI, WiMAX and the like without departing from the scope of the present invention.

The mobile terminal 22 includes a portable housing 23 and may include, a keypad 26, a camera module 29, a display 28, a speaker 32, a microphone 34, a transceiver 36, and a memory 38, any of which may communicate with a controller (processor) 42. Furthermore, the mobile terminal 22 also includes a scanner module 31 and a calibration module 30 according to some embodiments of the present invention, which also communicate with the processor 42. The processor 42 can be any commercially available or custom microprocessor.

It will be understood that although the scanner module 31 and calibration module 30 are illustrated as separate modules in FIG. 1, embodiments of the present invention are not limited to this configuration. For example, the scanner module 31 and the calibration module 30 could be combined without departing from the scope of the present invention.

As further illustrated in FIG. 1, the mobile terminal 22 may be associated with a GPS 25. The GPS 25 may communicate with the mobile terminal 22 via, for example, Bluetooth. Although the GPS 25 and the mobile terminal 22 are illustrated as separate in FIG. 1, embodiments of the present invention are not limited to this configuration. For example, the GPS 25 may be integrated with the mobile terminal 22 without departing from the scope of the present invention.

As further illustrated, the transceiver 36 typically includes a transmitter circuit 44 and a receiver circuit 46, which respectively transmit outgoing radio frequency signals to the base station transceiver 24 and receive incoming radio frequency signals, such as voice call and data signals, from the base station transceiver 24 via an antenna 48. The antenna 48 may be an embedded antenna, a retractable antenna or any antenna known to those having skill in the art without departing from the scope of the present invention. The radio frequency signals transmitted between the mobile terminal 22 and the base station transceiver 24 may include both traffic and control signals (e.g., paging signals/messages for incoming calls), which are used to establish and maintain a voice call communication with another party or to transmit and/or receive data, such as e-mail or Multimedia Message Service (MMS) messages, with a remote device. The processor 42 may support various functions of the mobile terminal 22, including functions related to the scanner module 31 and the calibration module 30 of the mobile terminal 22 according to some embodiments of the present invention.

In some embodiments of the present invention, the base station transceiver 24 is a radio transceiver(s) that defines a cell in a cellular network and communicates with the mobile terminal 22 and other mobile terminals in the cell using a radio-link protocol. Although only a single base station transceiver 24 is shown, it will be understood that many base station transceivers may be connected through, for example, a mobile switching center and other devices, to define a wireless communications network.

According to some embodiments of the present invention, the scanner module 31 is configured to scan a map into the mobile terminal. In some embodiments, the scanner module 31 may be used in combination with the camera module 29 to take a picture of the map. It will be understood that the display 28 should have a resolution capable of supporting the map so it is viewable by the user. In some embodiments, the map may be scanned in several segments and then the segments can be concatenated into a single map. Thus, according to some embodiments of the present invention, the map may be scanned at your destination without the use of a conventional scanner or a personal computer.

As illustrated, the calibration module 30 is coupled to the scanner module 31. The calibration module 30 may be configured to receive multiple reference coordinates (latitude and longitude) associated with locations on the scanned map from the GPS 25 associated with the mobile terminal 22. For example, coordinates for locations that are easily identified on the map, for example, a railroad crossing near the entrance to the trail, may be obtained using the GPS 25. Typically, 3 sets of coordinates are needed to calibrate the map. Once the reference coordinates are obtained, the calibration module 30 may be configured to calibrate the scanned map in the mobile terminal 22 based on the obtained multiple reference coordinates.

It will be understood that the more reference coordinates provided, the more accurate the calibration will be. In some embodiments of the present invention, the calibration module 30 may be configured to recalibrate the scanned map upon acquisition of additional reference coordinates associated with locations on the scanned map.

Thus, according to some embodiments of the present invention, both the scanner module 31 and the calibration module 30 operate in the mobile terminal 22 without communicating with external communications device, for example, a personal computer. Thus, a map can be scanned and calibrated at your destination, which may be desirable as maps and/or coordinates may not be available before arrival at your destination.

In some embodiments of the present invention, once the map is scanned and calibrated, the calibrated map may be sent/shared with a second mobile terminal using, for example, an ad hoc network, such as Bluetooth or WLAN. It will be understood that this may only be properly done if sharing is permitted by the copyright.

Operations of mobile terminals according to some embodiments of the present invention will now be discussed with respect to the flowcharts of FIGS. 2 and 3. Operations begin at block 200 by scanning a map into a mobile terminal using the mobile terminal as a scanner. In some embodiments of the present invention, scanning may include taking a picture of the map. Multiple reference coordinates associated with a location on the scanned map may be received at the mobile terminal from a GPS associated with the mobile terminal (block 220). The coordinates (latitude and longitude) may be associated with easily identifiable positions on the map, for example, a crossroads outside the hotel room. The GPS may be integrated with the mobile terminal or connected to the mobile terminal by, for example, Bluetooth. The scanned map is calibrated in the mobile terminal based on the received multiple reference coordinates (block 240).

Operations begin at block 305 by scanning multiple segments of the map. The multiple segments of the map may be concatenated into a single cohesive map (block 315). Multiple reference coordinates associated with locations on the scanned map may be obtained at the mobile terminal using a GPS associated with the mobile terminal (block 320). The scanned map is calibrated in the mobile terminal based on the received multiple reference coordinates (block 340).

It is determined if additional reference coordinates have been acquired (block 350). If it is determined that additional reference coordinates have been acquired (block 350), the map may be recalibrated in the mobile terminal based on the additional reference coordinates (block 360). If, on the other hand, it is determined that additional reference coordinates have not been acquired (block 350), operations remain at block 360 until additional coordinates are received.

As will be appreciated by one of skill in the art, the present invention may be embodied as a mobile terminal, method or computer program product. Accordingly, the present invention may take the form of an entirely hardware embodiment, a software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Furthermore, the present invention was described in part above with reference to flowchart illustrations and/or block diagrams of mobile terminals, methods, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The diagrams of FIGS. 1 through 3 illustrate the architecture, functionality, and operations of some embodiments of mobile terminals, methods and computer program products for map scanning and calibration using a mobile terminal. In this regard, each block may represent a module, segment, or portion of code, which comprises one or more executable instructions for implementing the specified logical function (s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A mobile terminal, comprising:

a scanner module configured to scan a map into the mobile terminal; and a calibration module, coupled to the scanner module, configured to receive multiple reference coordinates associated with locations on the scanned map from a global positioning system (GPS) associated with the mobile terminal and calibrate the scanned map in the mobile terminal based on the received multiple reference coordinates.

2. The mobile terminal of claim 1, wherein the calibration module is further configured to:

acquire additional reference coordinates associated with locations on the scanned map; and recalibrate the scanned map upon acquisition of the additional reference coordinates.

3. The mobile terminal of claim 1, wherein the calibration module is configured to receive the multiple reference coordinates and calibrate the scanned map within the mobile terminal without communicating with an external communications device.

4. The mobile terminal of claim 1, wherein the multiple reference coordinates are associated with a current position of a user so as to allow calibration of the scanned map based on the current position.

5. The mobile terminal of claim 1, further comprising a camera module, wherein the scanner module is associated with the camera module and wherein the scanner module is configured to scan the map by taking a picture of the map.

6. The mobile terminal of claim 1, wherein the scanner module is further configured to:

scan the map in multiple segments; and concatenate the multiple segments of the map into a single cohesive map.

7. The mobile terminal of claim 1, further comprising a GPS module integrated in the mobile terminal.

8. A method of scanning and calibrating a map using a mobile terminal, comprising:

scanning a map into the mobile terminal using the mobile terminal as a scanner;

receiving, at the mobile terminal, multiple reference coordinates associated with locations on the scanned map from a global positioning system (GPS) associated with the mobile terminal; and calibrating the scanned map in the mobile terminal based on the received multiple reference coordinates.

9. The method of claim 8, further comprising:

determining if additional reference coordinates associated with locations on the scanned map have been acquired; and recalibrating the scanned map in the mobile terminal if it is determined that additional reference coordinates have been acquired.

10. The method of claim 8, wherein receiving and calibrating further comprise receiving and calibrating without communicating with an external communications device.

11. The method of claim 8, wherein the multiple reference coordinates are associated with a current position of the user so as to allow calibration of the scanned map based on the current position.

12. The method of claim 8, wherein scanning a map comprises taking a picture of the map.

13. The method of claim 8, wherein scanning further comprises:

scanning the map in multiple segments; and concatenating the multiple segments of the map into a single cohesive map.

14. The method of claim 8, wherein the GPS associated with the mobile terminal is integrated in the mobile terminal.

15. A computer program product for scanning and calibrating a map using a mobile terminal, the computer program product comprising a computer-readable medium, which comprises computer readable program code that when executed, causes a computer to perform the following:

scan a map into a mobile terminal using the mobile terminal as a scanner;

receive, at the mobile terminal, multiple reference coordinates associated with locations on the scanned map from a global positioning system (GPS) associated with the mobile terminal; and calibrate the scanned map in the mobile terminal based on the received multiple reference coordinates.

16. The computer program product of claim 15, further comprising:

computer readable program code configured determine if additional reference coordinates associated with locations on the scanned map have been acquired; and computer readable program code configured to recalibrate the scanned map in the mobile terminal if it is determined that additional reference coordinates have been acquired.

17. The computer program product of claim 15, wherein the computer readable program code configured to receive and the computer readable program code configured to calibrate further comprise computer readable program configured to receive and calibrate without communicating with an external communications device.

18. The computer program product of claim 15, wherein the multiple reference coordinates are associated with a current position of the user so as to allow calibration of the scanned map based on the current position.

19. The computer program product of claim 15, wherein the computer readable program code configured to scan comprises computer readable program code configured to take a picture of the map.

20. The computer program product of claim 15, wherein the computer readable program code configured to scan further comprises:

computer readable program code configured to scan the map in multiple segments; and computer readable program code configured to concatenate the multiple segments of the map into a single cohesive map.

* * * * *

UNITED STATES PATENT AND TRADEMARK OFFICE
CERTIFICATE OF CORRECTION

PATENT NO. : 7,634,358 B2
APPLICATION NO. : 11/284041
DATED : December 15, 2009
INVENTOR(S) : Jendbro It is certified that error appears in the above-identified patent and that said Letters Patent is hereby corrected as shown below:

On the Title Page:

Item 74, Other Publications: Please correct “Bibley” to read -- Sibley --

In the Claims:

Column 9, Claim 11, Line 31: Please correct “the” to read -- a --

Column 10, Claim 18, Line 29: Please correct “the” to read -- a -- (1st occurrence)

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,634,358 B2
APPLICATION NO. : 11/284041
DATED : December 15, 2009
INVENTOR(S) : Magnus Jendbro It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 931 days.

Signed and Sealed this

Ninth Day of November, 2010

David J. Kappos
*Director of the United States Patent and Trademark Office*